(12) United States Patent
Axinte et al.

(10) Patent No.: US 6,646,228 B2
(45) Date of Patent: Nov. 11, 2003

(54) CORDLESS SOLDERING IRON

(75) Inventors: Dragos Axinte, Issaquah, WA (US); Grigore Axinte, Kent, WA (US)

(73) Assignee: Hyperion Innovations, Inc., Seattle, WA (US)

( * ) Notice: Subject to any disclaimer, the term of this patent is extended or adjusted under 35 U.S.C. 154(b) by 0 days.

(21) Appl. No.: 10/016,937

(22) Filed: Dec. 14, 2001

(65) Prior Publication Data

US 2002/0047001 A1 Apr. 25, 2002

Related U.S. Application Data

(63) Continuation-in-part of application No. 09/726,546, filed on Aug. 18, 2000.
(60) Provisional application No. 60/149,416, filed on Aug. 18, 1999.

(51) Int. Cl.[7] .................................................. B23K 3/00
(52) U.S. Cl. ......................................... 219/231; 228/51
(58) Field of Search ................................ 219/234, 231, 219/230, 220; 228/51

(56) References Cited

U.S. PATENT DOCUMENTS

| | | | | |
|---|---|---|---|---|
| 449,258 A | * | 3/1891 | Robinson | 219/234 |
| 2,162,615 A | * | 6/1939 | Harlan | 219/234 |
| 2,210,352 A | * | 8/1940 | Albietz | 219/234 |
| 2,251,557 A | * | 8/1941 | Weston | 219/234 |
| 2,504,338 A | * | 4/1950 | MacLatchie | 219/234 |
| 2,773,974 A | | 12/1956 | Markett | |
| 2,790,059 A | * | 4/1957 | Burnett | 219/234 |
| 3,032,637 A | * | 5/1962 | Wasserlein | 219/234 |
| 3,152,239 A | * | 10/1964 | Faulconer | 219/234 |
| 3,311,736 A | * | 3/1967 | Burton et al. | 219/234 |
| 3,337,713 A | * | 8/1967 | Abrams | 219/234 |
| 3,621,193 A | * | 11/1971 | Low | 219/234 |
| 4,171,477 A | * | 10/1979 | Funari | 219/56.21 |

FOREIGN PATENT DOCUMENTS

| | | |
|---|---|---|
| AT | 234835 | 12/1963 |
| GB | 657147 | 9/1951 |
| SU | 1590244 | * 9/1990 |

* cited by examiner

*Primary Examiner*—John A. Jeffery
(74) *Attorney, Agent, or Firm*—Christensen O'Connor Johnson Kindness PLLC

(57) ABSTRACT

The present invention provides a soldering iron with a graphite tip having two separate halves that are electrically isolated from one another. When both halves of the tip are applied to an electrically conductive material, such as the material to be soldered, an electrical circuit between the tip halves and an electrical power source is completed. Therefore, the tip can reach operating temperatures quickly. When the tip is removed from the joint, the electrical circuit is broken and the tip material may quickly cool to a temperature safe for human contact. The tip material permits higher power outputs than other battery operated portable soldering irons and permits over 300 joints for each full charge.

12 Claims, 3 Drawing Sheets

CORDLESS SOLDERING IRON

CROSS-REFERENCES TO RELATED APPLICATIONS

This application is a Continuation-in-Part of U.S. patent application Ser. No. 09/726,546, filed Aug. 18, 2000, which claims the benefit of U.S. Provisional Patent Application No. 60/149,416, filed Aug. 18, 1999.

FIELD OF THE INVENTION

The present invention relates to cordless electrical devices, more specifically, to soldering irons and soldering iron tips.

BACKGROUND OF THE INVENTION

In many industries and for some hobbyists, it is necessary to manually make electrically conductive connections between various electrical components. In order to make such connections, a wide variety of soldering irons have been developed, for use in a variety of applications, ranging from repair of printed circuit boards, use in the telecommunications industry, and use in the manufacture and repair of heavy industrial electrical and electromechanical equipment. Existing soldering irons vary by power source, application, performance, shape, size, temperature, tip type, heat source, price, and portability.

Regardless of the size or capability of the soldering iron, existing soldering iron tips are generally categorized into two main types. The first consists of a heating element surrounded by a non-conductive film material, which is then covered by a thermally conductive metallic shell. The tip is heated by the application of electricity to the heating element. Depending on the application, the tip size can vary widely. The power source may also vary, ranging from 2.4 volt batteries through a 220 volt alternating current conventional outlet. Regardless of the power source, the flow of electricity to the heating element is typically controlled by a switch in the electrical circuit leading to the heating element. The switch is often a manual switch located on the outer case of the soldering iron.

An alternate soldering iron tip includes a solid tip of a thermally conductive material, usually a metal, which is heated by burning butane. Such soldering irons are typically portable, and the butane is supplied from a cartridge within the tool.

A number of problems exist with the current types of soldering irons. Soldering irons that must be plugged into a conventional electrical outlet lack mobility and are restrictive in use. Regardless of the tip type, the time generally required to reach soldering temperatures initially ranges from 10 to 60 seconds. If the soldering iron has not completely cooled down between uses, subsequent uses may not require as much startup time, but are still not immediate. Similarly, the time required for desired cooling can be substantial, posing the danger of burns to the operator and his or her surroundings after the tool has been removed from the work surface and before the tool has cooled. Furthermore, metal tips may become soldered to the connection, damaging the connection as the tip is removed and requiring further repair.

Existing cordless soldering irons resolve the mobility issues with soldering irons connected to conventional outlets, but at the cost of further problems. Butane irons require the operator to store and maintain a highly flammable gas and do not resolve the other deficiencies noted above. Existing battery-powered cordless soldering irons can typically make only 125 connections per full charge and are only capable of equivalent power output in the range of about 15–25 watts.

In order to ensure that the operator is able to adequately view the joint to be soldered, existing electric soldering irons are sometimes provided with a small lamp disposed on the soldering iron to illuminate the tip and connection. In these devices, the light is controlled by the same switch that controls the flow of electricity to the heating element. A disadvantage of this system is the inability to use the light without heating the tip of the soldering iron. This requires the operator to carry a separate flashlight if he or she wishes to illuminate the surroundings without soldering or heating.

As noted above, soldering irons are primarily used for making electrically conductive connections in various forms of electrical and electronic equipment. A visual inspection of the soldered connection may not always accurately determine whether or not the connection has been formed correctly and is now electrically conductive. Therefore, those operators who wish to test their connection, or to test electrical continuity between any two other points in the circuit, must carry a separate continuity tester.

Thus, a need exists for a soldering iron that can heat up and cool down quickly, minimizing the risk of burning the operator and/or his or her surroundings. Ideally, the soldering iron would be portable and could be used to form a large number of connections at high power output without having to be recharged. There is a further need for a portable soldering iron which can also be used as a flashlight and/or a continuity tester, reducing the number of tools to be carried by the operator to the site of the work.

SUMMARY OF THE INVENTION

Generally described, the present invention provides a soldering iron, with a graphite tip having two separate halves that are electrically isolated from one another. The tip halves are each electrically connected to the opposite sides of an electrical power source. When both halves of the tip are applied to an electrically conductive material, such as the material to be soldered, an electrical circuit between the tip halves and electrical power source is completed. The halves of the tip are constructed from material having high electrical resistivity and low thermal conductivity. Therefore, the tip can reach operating temperatures quickly. When the tip is removed from the joint, the electrical circuit is broken and the tip material quickly cools.

Because electricity is only able to flow when the two pieces of the tip are electrically connected, no separate switch is required. Furthermore, the soldering iron may be used without waiting for the tip to heat. The tip also reduces the risk of burning the operator and/or his or her surroundings because it heats up and cools down quickly. Furthermore, the tip material eliminates the risk of the tip becoming stuck in the joint. The tip material also permits higher power outputs than other known battery-operated portable soldering irons and permits over 300 joints for each full charge.

In accordance with further aspects of the present invention, in one embodiment, the soldering iron also includes a light disposed on the case to illuminate the tip and connection. The light is controlled by a separate switch and permits the tool to be used to illuminate the operator's surroundings without actually having to heat the tip. This aspect of the invention permits the operator to avoid the necessity of carrying a separate light source when working or intending to work in areas without sufficient lighting.

In accordance with other aspects of the invention, another embodiment is provided in which the tool also includes an electrical lead connected in series with the lamp, the power source, and a continuity testing probe. This aspect of the invention permits the soldering iron to test circuit continuity by applying the lead and the probe directly to a newly soldered connection, or to another part of the circuit to be tested. This aspect of the invention permits the operator to avoid the necessity of carrying a separate continuity tester to perform this function.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
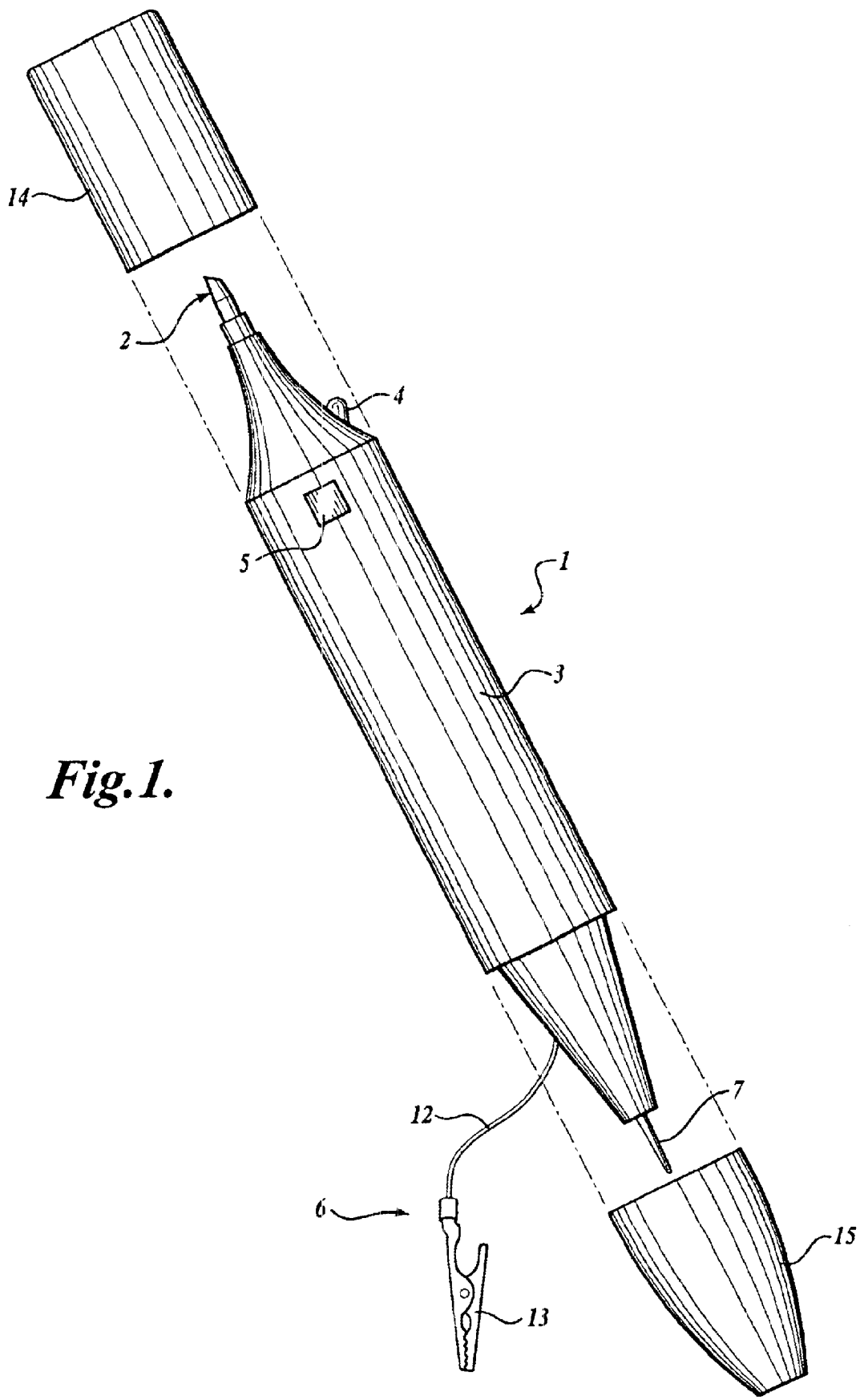
FIG. 1 is an elevation view of one embodiment of a soldering iron formed in accordance with the present invention.

Referring to FIG. 1, one embodiment of a cordless soldering iron formed in accordance with the present invention is shown. The soldering iron 1 includes a tip 2 attached to a body 3, an electric light 4 disposed on the body 3 to illuminate the tip 2 and surrounding work surfaces (not shown), a switch 5 disposed on the body 3 to control the electric light 4, a continuity testing lead 6 and a continuity testing probe 7 disposed on body 3, and an electrical power means 8 (see FIG. 5).

In more detail, the body 3 includes an elongate substantially tubular member of rigid heat resistant material, such as plastic or other materials known to those skilled in the art. The body is a unitary structure, assembled in parts, and configured to hold the sub-components described below. Those skilled in the art will recognize that the configuration of the body can vary widely for use in different applications.

Figure 4:
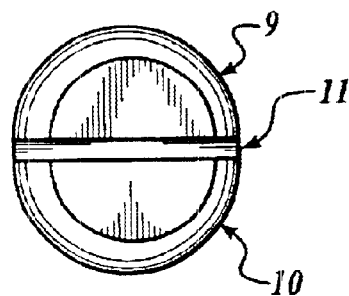
FIG. 4 is an end view of the soldering tip shown in FIG. 2.
Figure 3:
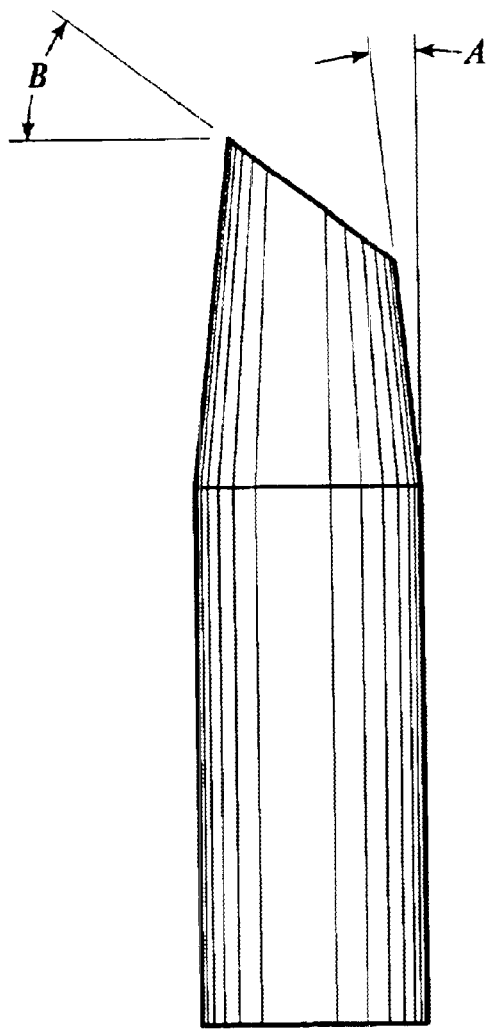
FIG. 3 is a side elevation of the soldering tip illustrated in FIG. 2.
Figure 2:
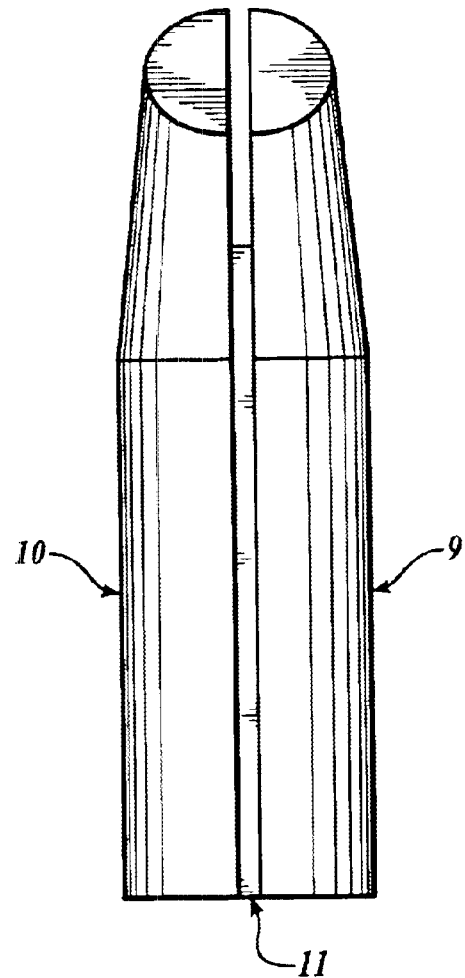
FIG. 2 is a front elevation view of one embodiment of a soldering tip formed in accordance with the present invention.

Referring to FIGS. 2, 3 and 4, the tip 2 includes two electrodes 9 and 10, electrically isolated from one another by an insulator 11 disposed therebetween. In the case of the embodiment illustrated in FIGS. 2, 3, and 4, the electrodes 9 and 10 are cross-sectionally shaped as half cylinders. In the longitudinal direction, each electrode is conically tapered along its distal third at an angle A and is further truncated at the distal tip by an angle B, thereby forming a flat, angled surface for application to the joint to be soldered. Those skilled in the art will recognize that the size and shape of the tip can also vary widely for use in different soldering applications.

The electrodes 9 and 10 are preferably formed of graphite, or a material containing graphite. For example, battery electrodes containing graphite, such as battery electrodes obtained from Eveready® Super Heavy Duty Lantern Battery Model No. 1209, manufactured by Eveready Battery Company, Inc., Cleveland, Ohio, have provided acceptable results. The electrodes may alternatively be formed from other materials that are semi-conductive electrically, and which have low thermal conductivity, for example germanium or silicon. The electrical resistivity of the tip materials should be at least 1,500 micro-Ohm cm. and is preferably over 3,000 micro-Ohm cm., while the thermal conductivity should be less than 10 BTU/hr-ft-° F. and is preferably in the range of 1 to 10 BTU/hr-ft-° F. Upon the application of electricity, the electrode material reaches a temperature of approximately 600° F. within a few seconds, and remains a solid at temperatures in excess of about 1,000° F. Furthermore, the electrode material preferably has sufficient compressive and tensile strength to permit the electrodes to be manufactured to tolerances of less than about 1 mm, rigidly held in place by the body 3 and applied to the connection to be soldered without mechanical failure. The tip should have a density in the range of 1.5 to 1.75 g/cc and a minimum flexural strength of 1,500 psi.

In one embodiment, the insulator 11 is formed of mica. The insulator 11 may alternatively be formed of a solid dielectric material that is able to withstand temperatures in excess of about 1,000° F. without changing state.

The tip 2 is attached in any conventional manner, preferably in detachable manner, to the body 3. Those skilled in the art will recognize that the means of attaching and detaching the tip to the body can vary widely for use in different soldering applications. Making the tip detachable also permits the use of different tips for different applications with the same tool. When secured, the electrodes 9 and 10 are separately electrically connected to the positive and negative terminals of an electrical power means 8 in a conventional manner. A variety of electrical power means 8 can be used, including rechargeable or non-rechargeable batteries, or low voltage provided from line voltage through a transformer. Electrical power means in FIG. 1 are a pair of nickel cadmium batteries encased within the body 3 to provide a nominal voltage of 2.4 volts and 700–750 milliamp hours. Electrodes 9 and 10 can optionally be electrically isolated from the electrical power means 8 by a switch or other means for interrupting the flow of electricity in an electrical circuit.

When both electrodes 9 and 10 are applied to an electrically conductive or semiconductive material, such as solder, an electrical circuit is completed from the positive terminal of electrical power means 8, through electrode 9, through the electrically conductive or semi-conductive material to which the tip has been applied, through electrode 10 and back to the negative terminal of electrical power means 8. The flow of electricity causes electrodes 9 and 10 to heat to a temperature of about 600° F. or greater within a few seconds, allowing the tool to thereafter be used in the same manner as a conventional soldering iron. As configured, the apparatus provides an alternating current equivalent of about 25–50 watts of heat to the joint to be soldered. An additional property of the preferred material for the electrodes is that it cannot become soldered to the joint while being used. When the operator of the apparatus wants to cease the application of heat, the apparatus can be removed from the electrically conductive or semi-conductive material, interrupting the flow of electricity. When the electricity is interrupted, the electrodes cool to a temperature safe for contact with human skin or clothing within a few seconds.

The apparatus optionally includes a conventional electric light 4, for example, an incandescent light bulb or light emitting diode. As shown on FIG. 1, the light 4 is positioned on the body 3 so that the light emitted will illuminate the tip 2 and the surrounding work area during use. As shown on FIG. 5, the light 4 is conventionally electrically connected to the electrical power means 8 and controlled by the switch 5. When switch 5 is closed, the circuit is completed from one terminal of the electrical power means 8, through the switch 5, through the electric light 4, and back to the opposite terminal of electrical power means 8, illuminating the electric light 4 without applying electricity to the tip 2. Because electric light 4 may be switched on without heating the tip 2, the light may be used to illuminate the surroundings of the operator without risk of accidentally burning the operator or nearby combustible materials.

Figure 5:
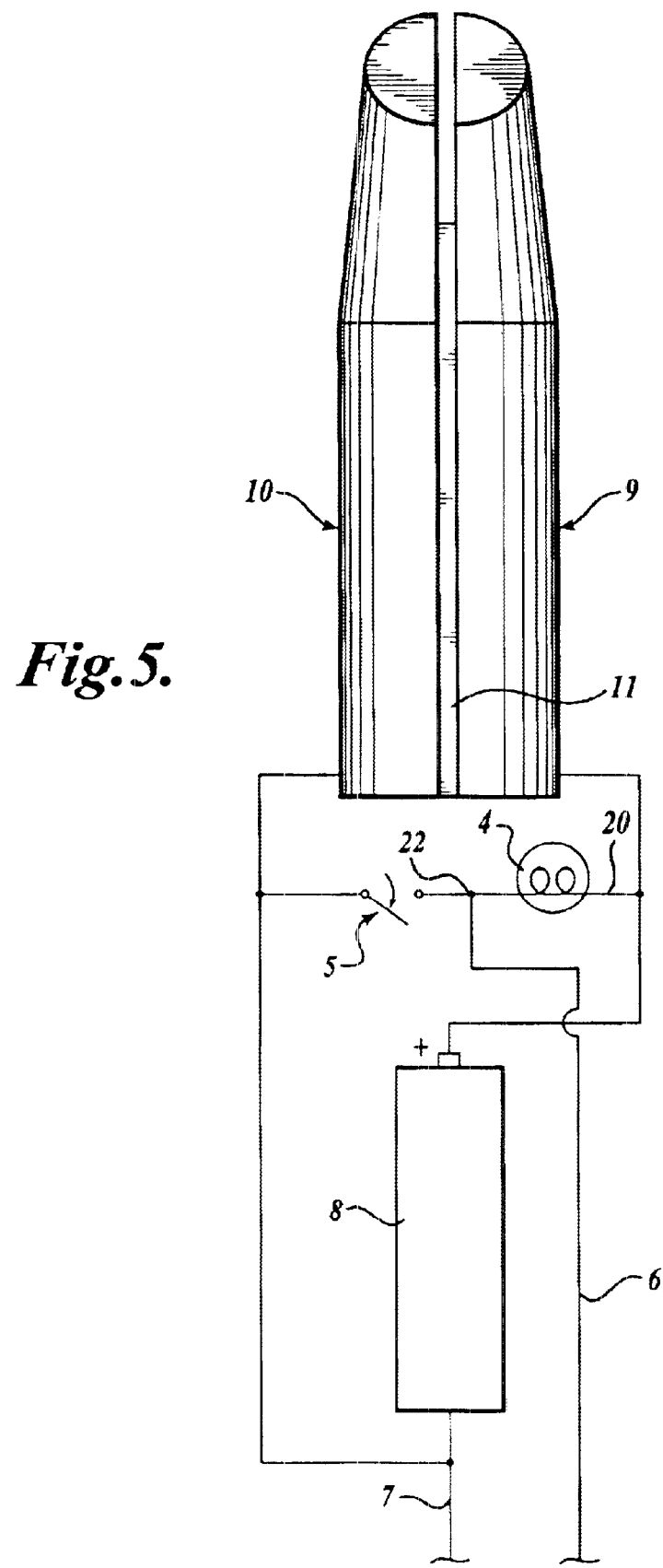
FIG. 5 is a circuit diagram for use with the embodiment of FIG. 1.

As shown in FIG. 1, the apparatus may further optionally be provided with a continuity testing assembly having a continuity testing lead 6 and a continuity testing probe 7. The lead 6 further includes a wire 12, for example, a 26 gauge wire, extending from the body 3 at one end and with an alligator clip 13 attached at the distal end of the wire 12. The continuity testing probe 7 is a probe similar to those used in conventional electrical test equipment, for example, a short, rigid, electrically conductive needle-shaped probe. It will be readily apparent to those skilled in the art that the continuity testing lead and continuity testing probe can be formed of any electrically conductive material without departing from the spirit and intention of the invention. As shown in FIG. 5, the continuity testing lead 6 is electrically connected to the electrical power means 8 via a path extending through the electric light 4. The probe 7 is connected to the opposite terminal of the power means 8. Referring to FIG. 5, the tip is connected in series to the power means 8. A path 20 is provided in parallel with the tip. The light 4 and the switch 5 are placed in series along the path 20. The lead 6 is connected to the path 20 at connection 22 located between the light 4 and switch 5. The assembly is used to test circuit by affixing alligator clip 13 to one side of the circuit to be tested and touching the probe 7 to the opposite side of the circuit. If the circuit being tested is electrically continuous, current will flow from the electrical power means 8, through the electric light 4, through the continuity testing lead 6, through the circuit being tested, through the continuity testing probe 7, and back to electrical power means 8, thus completing the circuit and illuminating electric light 4. The illumination of the light 4 quickly demonstrates the continuity of the tested circuit. This embodiment is particularly useful for cordless soldering irons, since the operator can test the soldered joint without having to obtain or carry a separate tool.

As shown in FIG. 1, end caps 14 and 15 are available to protect the tip 2 and continuity testing lead 6 from damage. The end caps are removably fixed to the body 2 by conventional means, for example, a friction fit, a clamp, threaded surfaces, etc.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A tip assembly for a soldering iron powered by an electrical power means comprising:

two electrodes, each having electrical resistivity of 1,500 micro-Ohm cm or greater, thermal conductivity less than or equal to 10 BTU/hr-ft-° F., flexural strength of at least about 1,500 psi, and a density of about 1.5 to 1.75 g/cc, each electrically isolated from the another by an insulator disposed between them, each of which said electrodes are configured to be separately electrically connected to the positive and negative terminals of said electrial power means.

2. The tip assembly of claim 1, wherein the electrodes each have thermal conductivity of 1 to 10 BTU/hr-ft-° F.

3. The tip assembly of claim 1, wherein the electrodes each have electrical resistivity of over 3,000 micro-Ohm cm.

4. The tip assembly of claim 3, wherein the electrodes each have thermal conductivity of 1 to 10 BTU/hr-ft-° F.

5. In a soldering iron powered by an electrical power means, the improvement comprising:

a soldering tip comprising two electrodes, each having electrical resistivity of 1,500 micro-Ohm cm or greater, thermal conductivity less than or equal to 10 BTU/hr-ft-° F., flexural strength of at least about 1,500 psi, and a density of about 1.5 to 1.75 g/cc, each electrically isolated from one another by an insulator disposed between them, each of which said electrodes are separately electrically connected to the positive and negative terminals of said electrical power means.

6. The tip assembly of claim 5, wherein the electrodes each have thermal conductivity of 1 to 10 BTU/hr-ft-° F.

7. The tip assembly of claim 5, wherein the electrodes each have electrical resistivity of over 3,000 micro-Ohm cm.

8. The tip assembly of claim 7, wherein the electrodes each have thermal conductivity of 1 to 10 BTU/hr-ft-° F.

9. A soldering apparatus comprising a tip attached to a body and an electrical power means, wherein said tip is rigidly held in place by said body and is comprised of two electrodes, each having electrical resistivity of 1,500 micro-Ohm cm or greater, thermal conductivity less than or equal to 10 BTU/hr-ft-° F., flexural strength of at least about 1,500 psi, and a density of about 1.5 to 1.75 g/cc, each electrically isolated from one another by an insulator disposed between them, each of which said electrodes are separately electrically connected to the positive and negative terminals of said electrical power means, and said body comprises an elongated substantially tubular member of any rigid heat-resistant material.

10. The tip assembly of claim 9, wherein the electrodes each have thermal conductivity of 1 to 10 BTU/hr-ft-° F.

11. The tip assembly of claim 9, wherein the electrodes each have electrical resistivity of over 3,000 micro-Ohm cm.

12. The tip assembly of claim 11, wherein the electrodes each have thermal conductivity of 1 to 10 BTU/hr-ft-° F.

* * * * *